Figure 1:
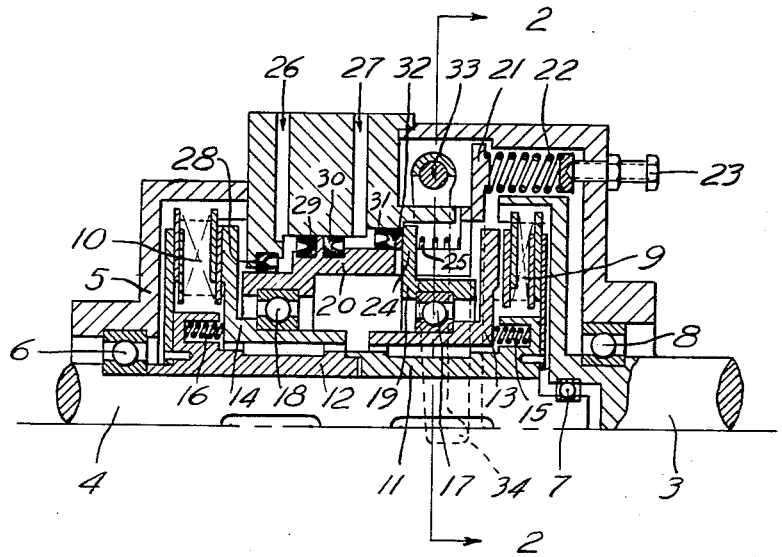

INVENTOR.
ALFRED-RUDOLF LEOPOLD
BY
ATTORNEY

United States Patent Office 2,836,270
Patented May 27, 1958

2,836,270

FLUID PRESSURE CONTROLLED CLUTCH AND BRAKE APPARATUS FOR HOISTING DRUMS

Alfred-R. Leopold, Neustadt am Rubenberge, Germany, assignor to Westinghouse-Bremsen-Gesellschaft m. b. H., Hannover, Germany Application May 31, 1956, Serial No. 588,561

Claims priority, application Germany June 28, 1955

12 Claims. (Cl. 192—12)

This invention relates to fluid pressure controlled clutch and brake apparatus for single cable or hoisting drums and the like, and more particularly to apparatus of the above type adapted, when fluid pressure control lines are vented, to assume a normal position in which a clutch is disengaged for disconnecting a drive shaft from the cable drum and a brake is engaged for preventing rotation of the cable drum.

In order to prevent a dangerous free fall condition, such as can occur if both the brake and the clutch are concurrently disengaged, it is necessary that during engagement of the clutch, the brake not release until the clutch has engaged, and that during disengagement of the clutch, the brake engage before or at the same instant as the clutch disengages.

To prevent this free fall condition, it has heretofore been proposed to provide special lever members in the fluid pressure control lines between an operator's fluid pressure control valve and the operating cylinder of the clutch and brake apparatus, so as to effect successive operation of the clutch and brake. It has also been proposed to provide a common ring piston which operates responsively to fluid pressure control for releasing a spring-loaded disc brake and, in the same operation, initiating engagement of the clutch; but such a piston, which is constructed in the nature of a switch ring, does not prevent the possibility of a temporary concurrent disengagement of both brake and clutch and hence may result in a temporary free fall condition, which is of course undesirable.

The principal object of this invention is therefore to provide an improved, relatively compact and simplified fluid pressure controlled clutch and brake apparatus for single cable or hoist drums, and which apparatus embodies a novel interlocking arrangement between the clutch and brake for positively insuring against a free fall condition.

According to this object, the improved apparatus comprises two concentrically arranged pistons, one of which is movable axially in one direction by fluid under pressure for successively effecting engagement of the clutch against a relatively light spring bias and thereafter shifting the other piston in said one direction against a heavier spring bias for thereupon permtting a light bias spring means to effect disengagement of the brake; said light bias spring means normally being overcome by the action of said heavier spring bias.

Another object is to provide an improved apparatus of the above type embodying means for mechanically or pneumatically shifting said other piston in said one direction independently of said one piston, for thereby releasing the brake while maintaining the clutch disengaged.

Another object is to provide an apparatus of the above type wherein the aforementioned heavier spring bias may be adjusted as desired.

Figure 2:
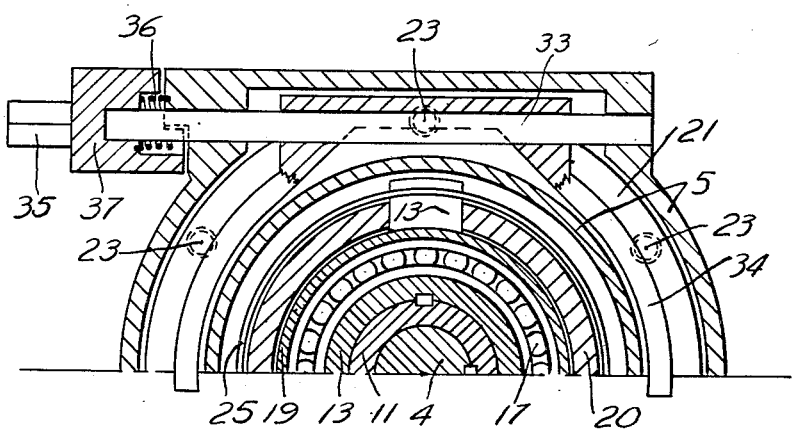

Other objects and advantages will become apparent from the following more detailed description of the invention and from the accompanying drawing, wherein: Fig. 1 is a longitudinal sectional view of an apparatus embodying the invention, only the upper half-portion of the rotating symmetrical part thereof (above the center line of the drive and driven shafts) being shown, the lower half-portion (below said center line) being omitted for purposes of simplified showing; and Fig. 2 is a sectional view taken along the line 2—2 of Fig. 1.

DESCRIPTION

Referring to Fig. 1 of the drawing, a cable or hoist drum (not shown) is secured for rotation with a driven shaft 4 which is carried by a bearing 6 within a sectionalized housing 5 and by a bearing 7 interposed radially between telescoping end portions of said shaft 4 and a coaxially arranged drive shaft 3; the latter shaft being carried by a bearing 8 interposed radially between it and the housing 5.

A clutch 9 is provided for effecting driving engagement between the drive shaft 3 and driven shaft 4. The clutch 9 is preferably in the form of a disc pack comprising a plurality of spaced annular discs having splined connection with a drive shaft 3 and a plurality of annular discs disposed in the spaces between the first-mentioned disc and having a splined connection with an annular clutch disc support 11 that surrounds and is keyed to the driven shaft 4 in proximity of the telescoping end portion thereof; only the end pairs of such discs of the disc pack being shown, for simplified illustration. An annular clutch disc member 13, having splined connection with support 11, is movable rightward for effecting engagement of the discs of the clutch 9. Relatively light helical springs 15, only one of which is shown, are interposed between the clutch support 11 and member 13 for biasing said member leftward for normally holding the discs of clutch 9 freed or disengaged.

A brake 10 is provided for preventing rotation of the shaft 4 when clutch 9 is disengaged. The brake 10 is preferably in the form of a disc pack comprising a plurality of spaced annular non-rotatable discs suitably splined to the housing 5 and a plurality of annular discs that are disposed in the spaces between the non-rotatable discs and have splined connection with an annular brake disc support 12 surrounding and keyed to the driven shaft 4 intermediate the clutch support 11 and bearing 6. An annular brake disc member 14, having splined connection with the support 12, is movable leftward for effecting engagement of the discs of brake 10. Relatively light helical springs 16, only one of which is shown, are interposed between the brake support 12 and member 14 for biasing said member rightward to thereby disengage or free the discs of brake 10.

Arranged between the brake 10 and clutch 9 is an annular brake operating piston 20 which, at its end adjacent said brake, is carried by a caged ball bearing 18 interposed radially between said piston and the rotatable disc member 14. Bearing 18 permits member 14 to rotate relative to piston 20, whereas spring 16 acts to maintain a radial shoulder on member 14 in abutting contact with the cage of said bearing for assuring that said member and piston will move axially, both rightward and leftward, in unison. At its end adjacent clutch 9, the piston has an outwardly directed annular flange 21. A plurality of circumferentially spaced relatively heavy helical springs 22, only one of which is shown, act on the flange 21 for biasing the piston 20 leftward and, through abutting contact of the cage of bearing 18 with member 14, normally holding the discs of brake 10 engaged against opposition of the relatively light springs 16 acting on the member 14. Each spring 22 bears against a base which is manually adjustable from outside of housing 5 by means of a respective rotatable adjusting screw 23 so that the tension of the springs 22 may be adjusted to impose any desired bias on the brake piston 20.

An annular clutch operating piston 19 is disposed in a counterbore extending inwardly from the right hand end of brake piston 20. Piston 19 is carried by a caged ball bearing 17 interposed radially between said piston and the member 13 for permitting rotation of said member relative to said piston; whereas the springs 15 act on member 13 to maintain a radial shoulder of the latter in abutting contact with the cage of said bearing, such that piston 19 and member 13 will move axially, both leftward and rightward, in unison. The piston 19 has a plurality of spaced, outwardly directed radial projections 24, only one of which is shown, which are accommodated in circumferentially spaced slots that extend from the right hand face of piston 20 and through the wall of the counterbore in the latter piston for facilitating insertion of the piston 19 within the piston 20 and also enabling the piston 19 to move axially relative to the piston 20. A relatively light helical spring 25, which always exerts a bias pressure less than the adjusted bias of spring 22, encircles the clutch piston 19 and is interposed between the projections 24 of piston 19 and the radial segments of the piston 20 circumferentially adjacent the slots, such that with the brake piston 20 in its leftmost position under action of springs 22, spring 25 (which is backed up against said radial segments of piston 20) will bias the clutch piston 19 leftward and cause spring 15 to hold member 13 in a leftmost position, in which it disengages the discs of clutch 9.

Two fluid pressure control ports 26, 27 provided in the housing 5 are adapted to be selectively charged with fluid under pressure or concurrently vented to atmosphere by operation of a suitable control valve device (not shown). The port 26 leads to an annular chamber surrounding the brake piston 20 and defined between a sealing ring 28 carried by the housing and a sealing ring 29 of larger diameter carried by said piston, such that upon supply of pressure fluid to port 26, such fluid will act on an annular surface of said piston for shifting the piston rightward against resistance of springs 22. The port 27 leads to an annular chamber surrounding the brake piston 20 and defined between a sealing ring 30 carried by said piston and a sealing ring 31 that is movable axially relative to said piston and housing and bears against a pressure ring 32 engaging the left side of the projections 24 of clutch piston 19.

As shown in Fig. 2, a pin 33, carried by the housing 5, is disposed at right angles to and in spaced relation to the common axis of the shafts 3, 4. Suitably keyed to the pin 33 is a fork 34 having two depending curved arms the ends of which are adapted to bear on diametrically opposite points of the brake piston flange 21. The pin 33 has a square end 35 which projects from the housing and to which end a suitable handle lever (not shown) may be connected for rotating the pin 33 and thereby swinging the arms of the fork 34 to thereby slidingly shift the piston 20 rightward (as viewed in Fig. 1) toward the clutch 9 against resistance of a torsional bias spring 36 secured at its respective ends to the housing 5 and to a member 37 secured to the pin 33. This torsional spring 36 normally biases the arms of the fork 34 to a rotative position in which they are ineffective to influence the position of piston 20.

Operation

Assuming initially that the ports 26, 27 are devoid of fluid under pressure, the brake piston 20 will be biased by springs 22 to its leftmost position, in which it acts through the medium of the cage of bearing 18 and the member 14 to hold the discs of brake 10 engaged; and the clutch piston 19 will be biased by spring 25 to its leftmost position, in which it permits springs 15 to bias member 13 to its leftmost position, in which it effects disengagement of the discs of clutch 9. Thus, under the assumed condition, the drive shaft 3 will rotate idly; clutch 9 will be disengaged; the driven shaft 4, which carries the cable drum (not shown), will be braked by the brake 10; and the respective components will assume a normal position in which they are shown in the drawing.

To release the brake 10 without effecting engagement of the clutch 9, as for example to play out cable from the drum, pressure fluid is supplied to port 26 by operation of the aforementioned control valve device. Pressure fluid thus supplied via port 26 to the piston chamber between sealing rings 28 and 29 will shift the brake piston 20 rightward against the preadjusted pressure of springs 22 to a brake release position. As the brake piston 20 moves to this position, the springs 16 will shift member 14 rightward a corresponding degree, maintaining contact between the radial shoulder on said member and the cage of bearing 18, and by thus shifting said member rightward effect disengagement of the discs of the brake 10. The aforementioned slots into which the radial projections 24 of the clutch piston 19 extend are of sufficient axial length so that the brake piston 20 in moving to its brake release position will not engage the projections on the clutch piston 19; and hence the clutch piston 19 will be maintained in its leftmost position, in which it is shown, by pressures of the springs 25, 15. When pressure fluid is vented from port 26, brake piston 20 will be returned to its leftmost position by pressure of springs 22 for effecting reengagement of the discs of brake 10.

To successively engage the clutch 9 and then release the brake 10, pressure fluid is supplied to port 27 while port 26 is maintained vented. Pressure of fluid thus supplied via port 27 to the piston chamber between the sealing rings 30 and 31 shifts the sealing ring 31 rightward relative to the then stationary brake piston 20, for imposing (through the medium of the pressure ring 32 and projections 24) a fluid pressure force on the clutch piston 19 for shifting the latter rightward against resistance of the spring 25 until this spring is sufficiently compressed; whereupon a substantially solid connection will be established between the clutch piston 19 and brake piston 20 and the clutch piston will continue to move rightward and thereby carry the brake piston 20 to its brake release position against pressure of the springs 22. It will thus be noted that when port 27 only is charged, the clutch 9 will first engage and then the brake 10 will be released.

As already noted, the tension of springs 22 may be adjusted by the screws 23 so as to impose any desired degree of bias on the brake piston 20 so as to thereby control the value of fluid pressure which must be developed in port 27 to effect release of the brake 10. In order to stop rotation of the driven shaft 4 and hence of the cable drum, pressure fluid is vented from port 27; whereupon the brake piston 20 will first be shifted leftward by the pressure of springs 22 for effecting reengagement of the discs of brake 10, and then the clutch piston 19 will be shifted leftward by pressure of spring 25 for permitting springs 15 to shift member 13 for disengaging the discs of the clutch 9.

If, with ports 26 and 27 both concurrently vented via the aforementioned control valve device, it is desired to release the brake 10 by hand, the pin 33 is turned in a counterclockwise direction (as viewed in Fig. 1) through the medium of the torsion spring 36 and the aforementioned hand lever (not shown) secured to the square end 35 of the pin. This counterclockwise movement of the pin 33 is transmitted via the arms of the fork 34 to the flange 21 of brake piston 20 for shifting piston 20 to its brake release position against resistance of the springs 22 for effecting release of the brake 10; meanwhile, the clutch piston 19 will remain stationary and the clutch 9 will be maintained disengaged, in the same manner as explained in connection with pneumatic brake release effected by charging of the port 26 with fluid under pressure.

Having now described the invention, what I claim as new and desire to secure by Letters Patent, is:

1. Clutch and brake apparatus of the type having a clutch device for controlling connection between a driving member and a driven member and a brake device for braking the driven member, said apparatus comprising, in combination, a brake operating piston member, a clutch operating piston member, first bias means for biasing said brake operating piston member in a direction to effect application of the brake device, second bias means interposed between said brake operating piston member and clutch operating piston member such that the force of said first bias means acts through said second bias means for shifting the clutch operating piston member in a direction for causing disengagement of the clutch device, and means defining a normally vented chamber which is chargeable with fluid under pressure for causing said clutch operating piston member to shift against resistance of said second bias means for effecting engagement of the clutch device and thereafter, through the medium of said second bias means, to shift said brake operating piston member against resistance of said first bias means for effecting release of the brake device, whereby the clutch device will be engaged before the brake device releases.

2. Clutch and brake apparatus of the type having a clutch device for controlling connection between a driving member and a driven member and a brake device for braking the driven member, said apparatus comprising, in combination, a brake operating piston member, a clutch operating piston member, first bias means biasing said brake operating piston member in a direction to effect application of the brake device, second bias means interposed between said brake operating piston member and clutch operating piston member such that the force of said first bias means acts through said second bias means for shifting the clutch operating piston member in a direction for causing disengagement of the clutch device, means defining a first normally vented chamber which is chargeable with fluid under pressure for causing said clutch operating piston member to shift against resistance of said second bias means for effecting engagement of the clutch device and thereafter, through the medium of said second bias means, to shift said brake operating piston member against resistance of said first bias means for effecting release of the brake device, and means defining a second normally vented chamber chargeable with fluid under pressure while the first chamber is vented for causing said brake operating piston member to shift against resistance of said first bias means and relative to the clutch operating piston member for causing release of the brake device while the clutch device is maintained disengaged.

3. A fluid pressure controlled clutch and brake apparatus for drivingly connecting a drive shaft and a driven shaft, and braking the driven shaft, said apparatus comprising, in combination, braking means biased to a disengaged position and operative when in an engaged position to prevent rotation of the driven shaft, clutch means biased to a disengaged position and operative when in engaged position to rotatably connect the driven shaft with the drive shaft, two coaxially arranged pistons one of which controls engagement of said braking means and the other of which controls engagement of said clutch means, resilient means interposed between said pistons, bias means normally urging said one piston to a position for effecting engagement of said braking means, a normally vented chamber chargeable with pressure fluid for causing thhe other piston to shift and thereby compress said resilient means and cause engagement of said clutch means and then, with said resilient means compressed, transmit force to said one piston for shifting the latter against resistance of said bias means to effect disengagement of said braking means, whereby said other piston will operate during such shifting to effect engagement of said clutch means before said one piston operates to effect disengagement of said braking means.

4. A fluid pressure controlled clutch and brake apparatus for controlling connection of a drive shaft with a driven shaft and controlling braking of the driven shaft, said apparatus comprising, in combination, braking means operative when engaged to prevent rotation of the driven shaft, normally disengaged clutch means operative when engaged to rotatably connect the drive shaft with the driven shaft, two coaxially arranged pistons, resilient means interposed between said pistons, bias means acting on one of said pistons for normally causing said one piston to effect engagement of said braking means, and means defining a normally vented chamber chargeable with pressure fluid for causing the other of said pistons to successively compress said resilient means and in so doing effect engagement of said clutch means and then, through the medium of such compressed resilient means, effect shifting of said one piston against resistance of said bias means for effecting disengagement of said braking means.

5. The combination according to claim 4, wherein said braking means comprises a stationary friction member and a member that is rotatably secured to the driven shaft and movable axially relative to the driven shaft by operative connection with said one piston for establishing and disestablishing frictional engagement with said stationary member, and wherein said clutch means comprises another friction member rotatably secured to the drive shaft and a second member that is rotatably secured to the driven shaft and is movable axially relative to the driven shaft by operative connection with said other piston for establishing and disestablishing frictional engagement with said other friction member.

6. The combination according to claim 4, including manually operable means for adjusting the bias imposed by said bias means on said one piston.

7. A fluid pressure controlled clutch and brake apparatus for controlling connection of a drive shaft with a driven shaft and controlling braking of the driven shaft, said apparatus comprising, in combination, braking means operative when engaged to prevent rotation of the driven shaft, clutch means operative when engaged to rotatably connect the drive shaft with the driven shaft, first relatively light bias means for urging the braking means to a disengaged position, second relatively light bias means for urging the clutch means to a disengaged position, two coaxially arranged annular pistons encircling and movable axially relative to the driven shaft, resilient means interposed between said pistons, relatively heavy bias means acting on one of said pistons for normally causing said one piston to assume a position for effecting engagement of said braking means against resistance of said first bias means, and means defining a normally vented chamber chargeable with pressure fluid for causing the other of said pistons to successively compress said resilient means and in so doing effect engagement of said clutch means against resistance of said second bias means and then, through the medium of such compressed resilient means, effect shifting of said one piston against resistance of said heavy bias means for effecting disengagement of said braking means.

8. A fluid pressure controlled clutch and brake apparatus for controlling connection of a drive shaft with a driven shaft and controlling braking of the driven shaft, said apparatus comprising, in combination, braking means operative when engaged to prevent rotation of the driven shaft, clutch means operative when engaged to rotatably connect the drive shaft with the driven shaft, first relatively light bias means for urging the braking means to a disengaged position, second relatively light bias means for urging the clutch means to a disengaged position, two coaxially arranged annular pistons encircling and movable axially relative to the driven shaft, resilient means interposed between said pistons, relatively heavy bias means acting on one of said pistons for normally causing said one piston to assume a position for effecting engagement of said braking means against resistance of said first bias means, means defining a normally vented chamber chargeable with pressure fluid for causing the other of said pistons to successively compress said resilient means and in so doing effect engagement of said clutch means against resistance of said second bias means and then, through the medium of such compressed resilient means, effect shifting of said one piston against resistance of said heavy bias means for effecting disengagement of said braking means, means defining a second normally vented chamber chargeable with pressure fluid while the first-mentioned chamber is vented for shifting said one piston relative to said other piston against resistance of said heavy bias means and thereby causing said first bias means to effect disengagement of said braking means while the clutch means is maintained disengaged by said second bias means.

9. In fluid pressure controlled clutch and brake apparatus for controlling connection of a drive shaft with a driven shaft and controlling braking of the driven shaft, the combination of braking means operative when engaged to prevent rotation of the driven shaft, clutch means operative when engaged to rotatably connect the drive shaft with the driven shaft, first relatively light bias means for urging the braking means to a disengaged position, second relatively light bias means for urging the clutch means to a disengaged position, two coaxially arranged annular pistons encircling and movable axially relative to the driven shaft, resilient means interposed between said pistons, relatively heavy bias means acting on one of said pistons for normally causing said one piston to assume a position for effecting engagement of said braking means against resistance of said first bias means, pin means carried by the housing and having an axis disposed at right angles to and spaced from the axis of the drive shaft, fork means keyed to said pin means and having arms adapted to engage said one piston, bias means for rotating said pin means to a position in which it is ineffective to shift said one piston, said pin means being manually rotatable against resistance of the last named bias means for effecting shifting of said one piston and against said heavy bias means and relative to said other piston for thereby causing the braking means to be disengaged by said first bias means while said clutch means is maintained disengaged by said second bias means.

10. A fluid pressure controlled clutch and brake apparatus for controlling connection of a drive shaft with a driven shaft and controlling braking of the driven shaft, said apparatus comprising, in combination, braking means comprising a pair of relatively movable friction members one of which is stationary and the other of which is rotatable by and movable axially relative to the driven shaft, said members being operative according as they are engaged or disengaged to prevent or permit rotation of the driven shaft, clutch means comprising a second pair of relatively movable friction members rotatably secured to the drive shaft and driven shaft, respectively, and one of which last named members is axially movable, said second pair of members being operative according as they are engaged or disengaged to rotatably connect or to disconnect the drive shaft and driven shaft, first relatively light bias means for urging the axially movable member of the braking means to a disengaged position, second relatively light bias means for urging the axially movable member of said clutch means to a disengaged position, two coaxially arranged annular pistons encircling and movable axially relative to the driven shaft, resilient means interposed between said pistons, relatively heavy bias means acting on one of said pistons for normally causing said one piston to effect engagement of the axially movable member of said braking means with its corresponding stationary member against resistance of said first bias means, and means defining a normally vented chamber chargeable with pressure fluid for causing the other of said pistons to successively compress said resilient means and in so doing effect engagement of the axially movable member of said clutch means against resistance of said second bias means and then, through the medium of such compressed resilient means, effect shifting of said one piston against resistance of said heavy bias means for causing said first bias means to disengage the axially movable member of said braking means from its corresponding stationary member.

11. A fluid pressure controlled clutch and brake apparatus for controlling connection of a drive shaft with a driven shaft and controlling braking of the driven shaft, said apparatus comprising, in combination, braking means operative when engaged to prevent rotation of the driven shaft, normally disengaged clutch means operative when engaged to rotatably connect the drive shaft with the driven shaft, a large annular piston slidably mounted in a housing and having at one end an outwardly directed radial flange, bias means acting on said large piston for urging the latter to a position for effecting engagement of said braking means, a smaller piston mounted in a counterbore extending inwardly from the flanged end of said large piston, said smaller piston having a plurality of radial projections which are movable in an axial direction within slots extending radially through the wall of the counterbore and extending inwardly from the flanged end of said large piston, spring means bearing against the projections of the smaller piston and the flanged end of the large piston adjacent the slots, said spring means biasing the smaller piston to a position for causing disengagement of said clutch means, means defining a first normally vented chamber, axially movable means surrounding the large piston and responsive to pressure of fluid supplied to said chamber to impose a force on said projections for initially shifting the smaller piston against compression of said spring means to thereby effect engagement of said clutch means and thereafter, through the medium of such compressed spring means, further shifting said smaller piston and thereby the large piston against resistance of said bias means for causing disengagement of said braking means, whereby said clutch means will be engaged prior to disengagement of said braking means.

12. The combination according to claim 11, including means defining a second normally vented chamber chargeable with pressure fluid while said first chamber is vented for causing said large piston to shift against resistance of said bias means for causing disengagement of said braking means, and wherein the axial length of the slots in the large piston is such that during this last described shifting of the large piston the radial projections on said smaller piston will not be shifted axially by said large piston, whereby said smaller piston will be maintained in position for maintaining said clutch means disengaged.

References Cited in the file of this patent
UNITED STATES PATENTS
2,279,597    Selmer  ---------------- Apr. 14, 1942